(12) United States Patent
Plesha

(10) Patent No.: US 12,082,570 B2
(45) Date of Patent: Sep. 10, 2024

(54) FISHING LURE ASSEMBLY AND METHOD OF FISHING THEREWITH

(71) Applicant: Benjamin Plesha, Crown Point, IN (US)

(72) Inventor: Benjamin Plesha, Crown Point, IN (US)

( * ) Notice: Subject to any disclaimer, the term of this patent is extended or adjusted under 35 U.S.C. 154(b) by 2 days.

(21) Appl. No.: 17/362,986

(22) Filed: Jun. 30, 2021

(65) Prior Publication Data

US 2022/0400662 A1 Dec. 22, 2022

(51) Int. Cl.
*A01K 85/00* (2006.01)
*A01K 85/10* (2006.01)

(52) U.S. Cl.
CPC .......... *A01K 85/1877* (2022.02); *A01K 85/10* (2013.01)

(58) Field of Classification Search
CPC .. A01K 85/187; A01K 85/10; A01K 85/1871; A01K 85/00; A01K 85/18; A01K 85/16; A01K 85/1803; A01K 85/1883; A01K 85/1887; A01K 85/1891
USPC .......... 43/42.13, 42.11, 42.15, 42.14, 42.16, 43/42.17, 42.18, 43.15, 42.47
See application file for complete search history.

(56) References Cited

U.S. PATENT DOCUMENTS

| | | | | |
|---|---|---|---|---|
| 1,787,726 A * | 1/1931 | Heddon | ........... | A01K 85/00 43/42.28 |
| 3,747,256 A * | 7/1973 | Haddock | ........... | A01K 85/00 43/42.13 |
| 4,011,681 A * | 3/1977 | Johnson | ........... | A01K 85/00 43/42.11 |
| 4,671,007 A * | 6/1987 | Stanczyk | ........... | A01K 85/00 43/42.11 |
| 4,718,191 A * | 1/1988 | Gentry | ........... | A01K 85/00 43/42.49 |
| 4,765,085 A * | 8/1988 | Wotawa | ........... | A01K 85/00 43/42.11 |
| 4,815,233 A * | 3/1989 | Pingel | ........... | A01K 85/00 43/42.11 |
| 4,891,901 A * | 1/1990 | Baker, Jr. | ........... | A01K 85/00 43/42.11 |
| 5,355,612 A * | 10/1994 | Smith | ........... | A01K 85/00 43/42.11 |
| 5,412,899 A * | 5/1995 | Reboul | ........... | A01K 85/00 43/42.42 |
| 5,461,819 A * | 10/1995 | Shindledecker | ........... | A01K 85/14 43/42.22 |
| 5,499,470 A * | 3/1996 | Reed | ........... | A01K 85/00 D22/129 |
| 5,605,004 A * | 2/1997 | Boullt | ........... | A01K 85/00 43/42.13 |
| 5,887,380 A * | 3/1999 | Matlock | ........... | A01K 85/00 43/42.74 |

(Continued)

*Primary Examiner* — Darren W Ark
*Assistant Examiner* — Zoe Tam Tran
(74) *Attorney, Agent, or Firm* — Hartman Global IP Law; Gary M. Hartman; Domenica N. S. Hartman

(57) ABSTRACT

A fishing lure assembly that includes a crank bait lure, a treble hook coupled to the rear loop of the crank bait lure, a spinner blade, a spinnerbait jig, and a fixture wire that couples the crank bait lure, the spinner blade, and the spinnerbait jig to define the fishing lure assembly, spaces the crank bait lure, the spinner blade, and the spinnerbait jig apart from one another, and provides a common connection point for securing the crank bait lure, the spinner blade, and the spinnerbait jig to a fishing line.

15 Claims, 1 Drawing Sheet

(56) References Cited

U.S. PATENT DOCUMENTS

| | | | | |
|---|---|---|---|---|
| 6,112,451 A * | 9/2000 | Webb | A01K 85/00 43/42.49 |
| 6,155,000 A * | 12/2000 | Ravencroft | A01K 85/01 43/42.31 |
| 6,158,162 A * | 12/2000 | Loniello | A01K 85/00 43/42.11 |
| 6,173,521 B1 * | 1/2001 | Rockhill, Jr. | A01K 85/00 43/42.13 |
| 7,467,491 B1 * | 12/2008 | Slocum | A01K 85/10 43/42.13 |
| D642,236 S * | 7/2011 | Szefcyk | D22/129 |
| 8,042,298 B1 * | 10/2011 | Yonekura | A01K 85/00 43/42.51 |
| 9,078,421 B1 * | 7/2015 | Rye | A01K 85/10 |
| 10,271,528 B1 * | 4/2019 | Chan | A01K 85/16 |
| 10,426,149 B1 * | 10/2019 | Coxey | A01K 85/14 |
| D867,517 S * | 11/2019 | Koppers | D22/131 |
| 10,602,728 B2 * | 3/2020 | Coxey | A01K 85/10 |
| 10,834,909 B1 * | 11/2020 | Rye | A01K 85/10 |
| 11,172,660 B2 * | 11/2021 | Hancock | A01K 85/10 |
| 2001/0023551 A1 * | 9/2001 | Hattori | A01K 85/16 43/42.32 |
| 2004/0006908 A1 * | 1/2004 | Essad | A01K 85/00 43/42.13 |
| 2004/0074134 A1 * | 4/2004 | Morlen | A01K 83/00 43/42.13 |
| 2005/0166444 A1 * | 8/2005 | Taylor | A01K 85/14 43/42.13 |
| 2006/0005458 A1 * | 1/2006 | Maki | A01K 85/00 43/42.13 |
| 2008/0263935 A1 * | 10/2008 | Albrecht | A01K 85/00 43/42.49 |
| 2010/0180488 A1 * | 7/2010 | Keeton | A01K 85/00 43/42.31 |
| 2010/0263258 A1 * | 10/2010 | Hinz | A01K 85/12 43/42.13 |
| 2010/0281756 A1 * | 11/2010 | Lau | A01K 85/10 43/42.11 |
| 2012/0096757 A1 * | 4/2012 | Langer | A01K 85/18 43/42.49 |
| 2015/0128477 A1 * | 5/2015 | Heesch | A01K 85/10 43/42.39 |
| 2016/0242399 A1 * | 8/2016 | McClelland | A01K 85/10 |
| 2017/0339933 A1 * | 11/2017 | Smith | A01K 85/10 |
| 2017/0347635 A1 * | 12/2017 | Sandefur | A01K 85/02 |
| 2019/0166813 A1 * | 6/2019 | VanZant | A01K 85/10 |
| 2019/0343102 A1 * | 11/2019 | Choi | A01K 85/10 |
| 2020/0060248 A1 * | 2/2020 | Choate | A01K 85/10 |
| 2020/0267954 A1 * | 8/2020 | Watters | A01K 85/10 |
| 2021/0000094 A1 * | 1/2021 | Dunbar | A01K 85/10 |
| 2021/0282381 A1 * | 9/2021 | Hancock | A01K 85/10 |

* cited by examiner

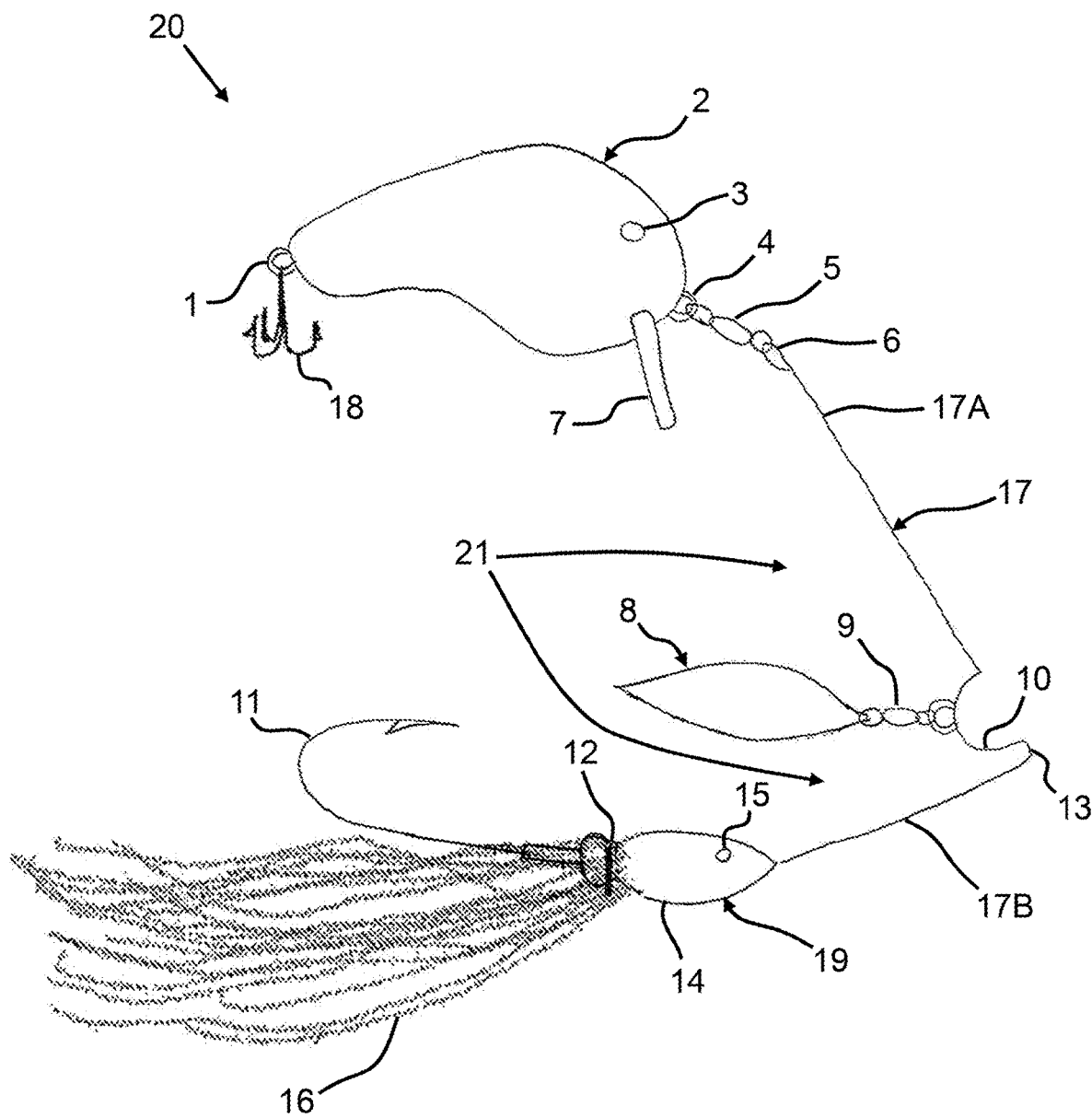

FISHING LURE ASSEMBLY AND METHOD OF FISHING THEREWITH

BACKGROUND OF THE INVENTION

The present invention generally relates to fishing lures. The invention particularly relates to a fishing lure assembly that includes a crank bait lure, a spinner blade, and a spinnerbait jig lure.

BRIEF DESCRIPTION OF THE INVENTION

The present invention provides a fishing lure assembly and a method of fishing therewith.

According to one aspect of the invention, a fishing lure assembly is provided that includes a crank bait lure, a spinner blade, a spinnerbait jig, and a fixture wire that couples the crank bait lure, the spinner blade, and the spinnerbait jig to define the fishing lure assembly, space the crank bait lure, the spinner blade, and the spinnerbait jig apart from one another, and provide a common connection point for securing the crank bait lure, the spinner blade, and the spinnerbait jig to a fishing line.

Technical effects of the fishing lure assembly described above preferably include the ability to simultaneously use the crank bait lure, the spinner blade, and the spinnerbait jig.

Other aspects and advantages of this invention will be appreciated from the following detailed description.

BRIEF DESCRIPTION OF THE DRAWINGS

FIG. 1 represents a side view of a fishing lure assembly in accordance with a nonlimiting embodiment of this invention.

DETAILED DESCRIPTION OF THE INVENTION

FIG. 1 represents a fishing lure assembly 20 in accordance with certain nonlimiting aspects of the invention. The fishing lure assembly 20 includes a fixture wire 17 that couples and supports other components of the fishing lure assembly 20, including a crank bait lure 2, a spinner blade 8, and a spinnerbait jig 19. These components are spaced apart from one another along the length of the fixture wire 17. The fixture wire 17 further provides a common connection point 13 (e.g., a bend in the fixture wire 17) for securing the fishing lure assembly 20 to a fishing line (not shown). The fixture wire 17 generally defines a V-shape defining upper and lower legs 17A and 17B having an intersection at the bend that forms the common connection point 13, thereby defining a V-shaped space 21 formed by and between the upper and lower legs 17A and 17B. The crank bait lure 2 is coupled to the end of the upper leg 17A of the V-shape, the spinnerbait jig 19 is coupled to the end of the lower leg 17B of the V-shape, and the spinner blade 8 is coupled to the fixture wire 17 at an intermediate position between the ends of the upper and lower legs 17A and 17B. In FIG. 1, the spinner blade 8 is coupled to the upper leg 17A adjacent the intersection of the upper and lower legs 17A and 17B so as to be within the V-shaped space 21, between the common connection point 13 and the crank bait lure 2, and closer to the common connection point 13 than to the crack bait lure 2.

To facilitate the description provided below of the fishing lure assembly 20 represented in the drawings, relative terms, including but not limited to, "vertical," "horizontal," "front," "rear," "side," "forward," "rearward," "upper," "lower," "above," "below," "right," "left," etc., may be used in reference to an orientation of the fishing lure assembly 20 during its operation (e.g., the orientation of the fishing lure assembly 20 as represented in FIG. 1), and therefore are relative terms that indicate the construction, installation and use of the invention.

The common connection point 13 of the fixture wire 17 is configured to be coupled to a fishing line and to lead the remainder of the fishing lure assembly 20 while the fishing lure assembly 20 is in water and being pulled with the fishing line, wherein the upper and lower legs 17A and 17B of the fixture wire 17 are configured to trail the common connection point 13 while the fishing lure assembly 20 is in water and being pulled with the fishing line. The crank bait lure 2 is coupled to a bend 6 at the end of the upper leg 17A of the fixture wire 17, the spinnerbair jig is coupled to the end of the lower leg 17B of the fixture wire 17, and the spinner blade 8 is coupled to an arc-shaped bend 10 formed in the upper leg 17A of the fixture wire 17 adjacent the common connection point 13 of the fixture wire 17. As represented in FIG. 1, the end of the upper leg 17A, and therefore the crank bait lure 2, is configured to be located directly above the end of the lower leg 17B, and therefore above the spinnerbait jig 19, while the fishing lure assembly 20 is in water and being pulled with the fishing line.

The crank bait lure 2 has a body that includes a front loop 4 disposed at a front end of the body, an eye 3 in the body, a rear loop 1 disposed at a rear end of the body, and a lip or bill 7 disposed adjacent the front end of the body and below the front loop 4 to affect maneuverability of the crank bait lure 2 (e.g., angled to promote crank bait lure-type action). In FIG. 1, a single treble hook 18 is coupled to the rear loop 1 of the crank bait lure 2. The crank bait lure 2 does not include a treble hook coupled adjacent a center of the body thereof to reduce the likelihood of and/or ensure no interference with the spinner blade 8 therebelow. The crank bait lure 2 may be coupled to the end of the upper leg 17A of the fixture wire 17 with a first swivel 5 to promote and/or enable mobility of the crank bait lure 2. The crank bait lure 2 may vary in shape, size, color, and depth range, and may comprise various materials (for example, the lip may be formed of a plastic material).

The spinner blade 8 has a body that may be configured to spin, flutter, and/or reflect light (i.e., "flash") while the fishing lure assembly 20 is in water and being pulled with a fishing line. As noted above, the spinner blade 8 is located in the V-shaped space 21 formed by and between the upper and lower legs 17A and 17B of the fixture wire 17 and is coupled to an attachment point located on the arc-shaped bend 10 of the fixture wire 17. The arc-shaped bend 10 has a curved shape that extends away from the common connection point 13 of the fixture wire 17, and in the embodiment of FIG. 1 can be seen to have a semicircle shape that has a larger radius than the bend that forms the common connection point 13 and extends in a direction roughly perpendicular to the upper leg 17A of the fixture wire 17. The arc-shaped bend 10 of the fixture wire 17 provides for attachment of the spinner blade 8 without the use of stoppers. The spinner blade 8 may vary in shape, size, and color, and may comprise various materials (for example, the spinner blade 8 may be formed of a reflective metallic material that promotes "flashing"). The spinner blade 8 may be a specific type of spinner blade 8 including but not limited to deep cut, Indiana, whiptail, French, in-line, Doc Shelton, royal, chopper, buzz-style, and other blade types.

The spinnerbait jig 19 has a body that includes a head 14 disposed at a front end of the body, an eye 15 on the head 14, a spinnerbait skirt 16 disposed at a rear end of the body, a fastener 12 fixed to the head 14 and configured to attach the spinnerbait skirt 16 to the body, and a hook 11 extending from the rear end of the body. The hook 11 may be molded-in or built-in to the body. The spinnerbait jig 19 may be coupled to the end of the lower leg 17B of the fixture wire 17 with a second swivel 9.

The arrangement of the components on the fixture wire 17 allows adequate space for each of the components to perform its own specific action as the fishing line pulls the fishing lure assembly 20 through the water. Specifically, the crank bait lure 2 is capable of moving freely and performing crank bait lure-type actions at the upper extremity of the fixture wire 17, the spinnerbait jig 19 is capable of performing spinner jig lure-type actions at the lower extremity of the fixture wire 17, and the spinner blade 8 is capable of performing spinner blade-type actions within the V-shaped space 21 formed by and between the upper and lower legs 17A and 17B so as to be between the crank bait lure 2 and the spinnerbait jig 19. As such, all of the components are able to perform their respective actions simultaneously without interfering with the action of the other components.

The fishing lure assembly 20 provides for a method of fishing that includes securing the fixture wire 17 to a fishing line, locating the fishing lure assembly 20 in water, and pulling the fishing lure assembly 20 through the water with the fishing line.

While the invention has been described in terms of a specific embodiment, it is apparent that other forms could be adopted by one skilled in the art. For example, the physical configuration of the fishing lure assembly 20 could differ from that shown, and materials and processes/methods other than those noted could be used. Therefore, the scope of the invention is to be limited only by the following claims.

The invention claimed is:

1. A fishing lure assembly comprising:
 a crank bait lure;
 a spinner blade;
 a spinnerbait jig; and
 a fixture wire having a length that terminates at oppositely-disposed upper and lower distal ends of the fixture wire, the fixture wire coupling the crank bait lure, the spinner blade, and the spinnerbait jig together to define the fishing lure assembly, the fixture wire spacing the crank bait lure, the spinner blade, and the spinnerbait jig apart from one another along the length of the fixture wire, and the fixture wire providing a common connection point for securing the crank bait lure, the spinner blade, and the spinnerbait jig to a fishing line, the fixture wire having a V-shape that defines upper and lower legs, an intersection of the upper and lower legs at a bend that forms the common connection point, and a V-shaped space formed by and between the upper and lower legs, the upper and lower legs extending in a rearward direction from the common connection point such that the V-shaped space is located in the rearward direction of the common connection point, the crank bait lure being coupled to the upper distal end of the fixture wire at an end of the upper leg, the spinnerbait jig being coupled to the lower distal end of the fixture wire at an end of the lower leg, and the spinner blade being coupled to the fixture wire at an attachment point formed in the upper leg and at a location in a first portion of the length of the fixture wire that is above the common connection point and closer to the common connection point than to the upper distal end of the upper leg; and
 the attachment point of the spinner blade being an arc-shaped bend that is physically defined in and by the first portion of the length of the fixture wire and one end of the arc-shaped bend is at but separate from the common connection point, the arc-shaped bend protruding from the upper leg into the V-shaped space and above the common connection point, the arc-shaped bend having a radius that is larger than the bend that forms the common connection point.

2. The fishing lure assembly of claim 1, further comprising:
 a first swivel coupling the crank bait lure to the upper distal end of the fixture wire at the end of the upper leg; and a second swivel coupling the spinner blade to the fixture wire at the attachment point formed in the upper leg.

3. The fishing lure assembly of claim 1, wherein the upper leg of the fixture wire is configured to be located above the lower leg of the fixture wire while the fishing lure assembly is in water and being pulled with the fishing line.

4. The fishing lure assembly of claim 1, wherein the common connection point of the fixture wire is configured to be coupled to the fishing line and to lead the remainder of the fishing lure assembly while the fishing lure assembly is in water and being pulled with the fishing line, wherein the upper and lower legs of the fixture wire are configured to trail the common connection point while the fishing lure assembly is in water and being pulled with the fishing line.

5. The fishing lure assembly of claim 1, wherein the arc-shaped bend of the fixture wire is entirely a semicircle.

6. The fishing lure assembly of claim 1, wherein the spinner blade is coupled to the arc-shaped bend of the fixture wire without the use of stoppers.

7. The fishing lure assembly of claim 1, wherein the spinner blade is configured to spin while the fishing lure assembly is in water and being pulled with the fishing line.

8. The fishing lure assembly of claim 1, wherein the spinner blade is configured to reflect light while the fishing lure assembly is in water and being pulled with the fishing line.

9. The fishing lure assembly of claim 1, wherein the crank bait lure has a body that comprises a front loop disposed at the front end of the body, a rear loop disposed at a rear end of the body, a treble hook coupled to the rear loop of the crank bait lure, and a bill disposed adjacent a front end of the body below the front loop and configured to affect maneuverability of the crank bait lure.

10. The fishing lure assembly of claim 9, wherein the crank bait lure does not include a treble hook coupled adjacent a center of the body thereof.

11. The fishing lure assembly of claim 1, wherein the spinnerbait jig has a body that comprises a head disposed at a front end of the body, a spinnerbait skirt disposed at a rear end of the body, a fastener fixed to the head and configured to attach the spinnerbait skirt to the body, and a hook extending from the rear end of the body.

12. A method of fishing with the fishing lure assembly of claim 1, the method comprising:
 securing the fixture wire to the fishing line;
 locating the fishing lure assembly in water; and
 pulling the fishing lure assembly through the water with the fishing line.

13. The fishing lure assembly of claim 1, wherein the arc-shaped bend extends in a direction perpendicular to the upper leg.

14. The fishing lure assembly of claim 1, wherein the upper leg of the fixture wire is straight except for the arc-shaped bend in the first portion of the length of the fixture wire.

15. The fishing lure assembly of claim 1, wherein the fixture wire is entirely the V-shape except for the arc-shaped bend in the first portion of the length of the fixture wire.

\* \* \* \* \*